United States Patent Office 3,535,149
Patented Oct. 20, 1970

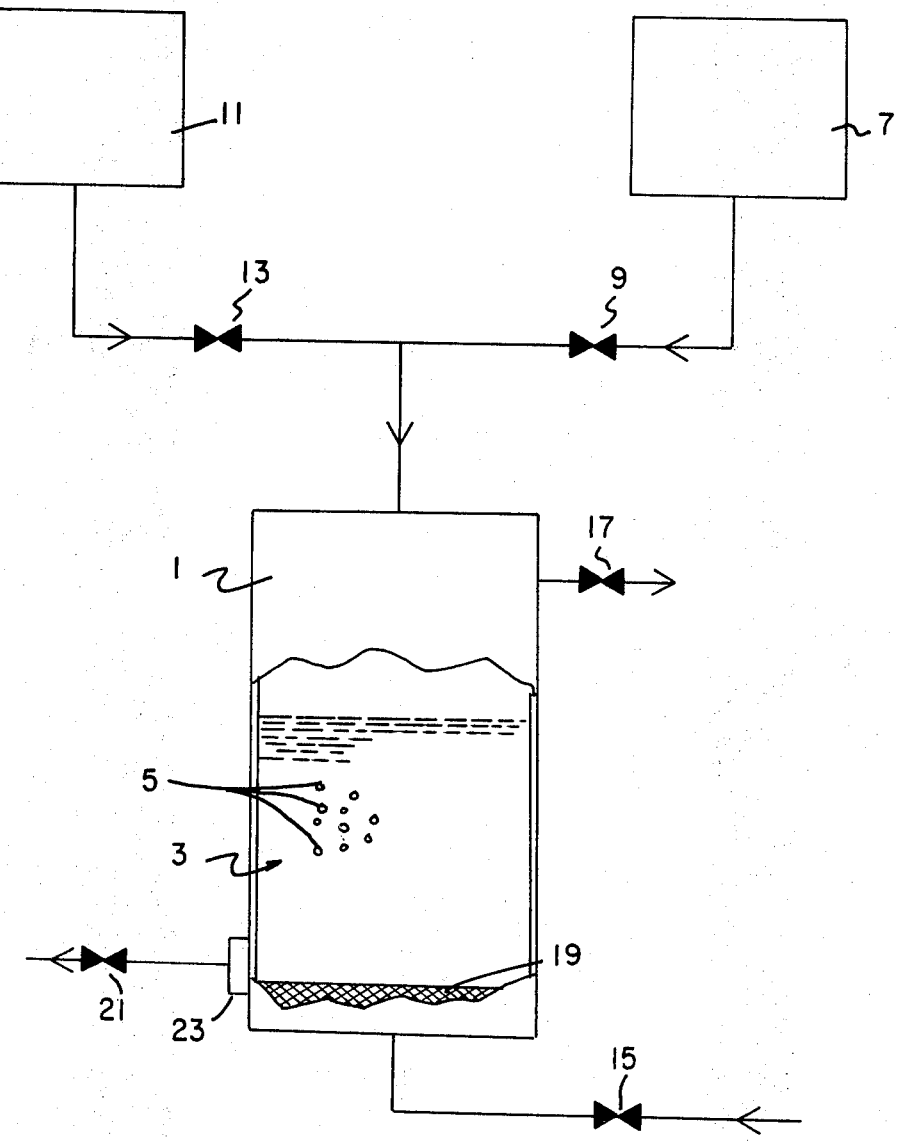

3,535,149
PROCESS FOR PRODUCING PARTICULATE NICKEL COATED ALKALINE EARTH CARBONATES
Richard Dunn, Martin B. MacInnis, and Emil J. Mehalchick, Towanda, Pa., assignors to Sylvania Electric Products Inc., a corporation of Delaware
Filed June 13, 1968, Ser. No. 736,841
Int. Cl. C23c 3/04
U.S. Cl. 117—100     9 Claims

ABSTRACT OF THE DISCLOSURE

A novel, improved method for producing alkaline earth carbonates coated with nickel. The method involves the steps of dispersing a finely divided alkaline earth carbonate in a solution of a heat decomposable nickel compound. Heating the dispersion at a temperature sufficient to decompose the nickel compound produces a finely divided alkaline earth carbonate uniformly covered with nickel. The product of the process is especially useful in the production of cathodes for electron tubes.

BACKGROUND OF THE INVENTION

Field of the invention

This invention relates to an improved method for producing metal coated materials. More precisely, the invention disclosed herein relates to an improved method for producing nickel coated alkaline earth carbonates.

Description of the prior art

Nickel coated alkaline metal carbonates are valuable products of commerce. For example, they are advantageously employed as materials of construction in the fabrication of cathodes for electron tubes. The manners and methods by which nickel coated metal carbonates are employed in the fabrication of cathodes need not be discussed in detail here. These manners and methods are well known to those skilled in the art to which the present invention pertains. However, details relating to the fabrication of such electrodes can be found in an article entitled "New Cathode for High Power Electron Tube" by D. W. Maurer and C. M. Pleass. This article was printed on pages 460–461 of the Bell Laboratories Record of December 1965 and the article is incorporated herein by reference.

The average particle diameter of the substrate, e.g., the alkaline earth carbonate, appears to be a significant parameter affecting the performance characteristics of nickel alkaline earth carbonates in cathodes. For example, the best balance of performance characteristics are obtained when the average particle diameter of the alkaline earth carbonate substrate is between about 1.0 and 10 microns. By average particle diameter it is meant that the greater number of particles have an average diameter of the size recited although particles of larger and smaller diameter can be present.

Metal coating of substrates of an average particle diameter below about 10 microns imposes severe restrictions on the art and especially limits the type of process that can be employed to achieve effective and uniform coating of such substrates. For example, conventional coating processes involving vapor deposition of metals on a fluidized substrate are suitable only when particles of an average diameter between about 50–300 microns are coated. However, when the particles involved are of an average particle diameter of about 10 microns or less, "slugging" rather than fluidization of the particles occurs unless highly specialized techniques and/or apparatus are employed to compensate for or overcome this phenomenon.

To date, the most effective manner of producing nickel coating alkaline metal carbonates of a particle diameter below about 10 microns is by way of the method described in the aforementioned article of D. W. Maurer and C. M. Pleass. Essentially this method involves a modified form of vapor plating wherein nickel carbonyl is introduced to a dispersion of the metal carbonate in amyl acetate and heated to a temperature sufficient to decompose the nickel carbonyl. Upon decomposition, the nickel deposits on the surface of the substrate thereby producing a nickel coated alkaline earth metal carbonate.

The above method, however, is not without attendant inherent difficulties. For example, nickel carbonyl is a highly toxic, volatile substance which decomposes even at room temperature. Accordingly, the thickness of the nickel deposited on the substrate is primarily dependent on those parameters which operate in conventional vapor deposition processes. Such parameters cannot easily be adjusted so as to readily obtain precise control over the uniformity of the thickness of the coating on the substrate. Moreover, it is difficult to assure intimate contact between the nickel carbonyl and dispersed substrate at the temperatures employed by reason of the volatility and insolubility of the nickel carbonyl. In order to compensate for such disadvantages, equipment of intricate design is required together with the services of a highly skilled operator or technician. All of these features render the method unsuitable for routine day to day operation and there is an outstanding need in the art for a simple but reliable method for producing nickel coated alkaline earth carbonates of uniform quality.

SUMMARY OF THE INVENTION

In accordance with the present invention, a novel, improved process for producing nickel coated metal is presented. Essentially, the process involves the steps of dispersing particulate alkaline earth metal carbonates of an average particle diameter between about 1.0 to 10 microns in a solution of a decomposable nickel compound. Upon heating the dispersion at a temperature sufficient to decompose the nickel compound, nickel is deposited on the surface of the carbonates to produce nickel coated alkaline earth metal carbonates which are especially useful in the fabrication of electrodes. Quite surprisingly, the coated products produced in accordance with the practice of the present invention have a coating which is remarkedly uniform in thickness. Moreover, in accordance with the practice of the present invention, the thickness of the nickel deposited on the alkaline earth carbonate can be rather precisely predetermined and controlled by adjusting the concentration of the nickel compound in solution with respect to the amount of carbonate dispersed therein.

DESCRIPTION OF THE PREFERRED EMBODIMENTS

The practice of the present invention as well as operational features thereof will be better understood by reference to the accompanying drawing. The drawing illustrates a view in elevation of an arrangement of apparatus suitable for practicing the invention with portions of said apparatus cut away to illustrate features thereof in more detailed fashion.

Referring now to the drawing, element 1 represents the chamber or zone wherein the coating occurs. In the embodiment shown, the chamber or zone 1 is an elongated pressure vessel mounted so that its longitudinal axis extends in a vertical position. Means to heat chamber 1 are not shown since such means are conventional and known to the art. The embodiment shown is employed to produce the coated products of the present invention by way of a batch process. Accordingly, a solution of a nickel compound 3 having a particulate alkaline earth carbonate 5 dispersed therein is shown in cut away portion of chamber 1. The desired amount of particulate alkaline earth carbonate is preferably charged first to chamber 1 from tank 7 by way of valve means 9.

The particles can be charged into chamber 1 by entraining them in a suitable gas or by dispersion in the solvent. The solution of nickel compound generally premixed to the desired initial concentration is charged to chamber 1 from tank 11 by way of valve means 13. If desired, the concentration of the nickel solution charged to chamber 1 can be replenished by incrementally adding additional solution to chamber 1 by way of valve means 13 as the coating process proceeds.

After charging the solution 3 and carbonate 5 to chamber 1, the nickel compound is decomposed by heating chamber 1. At least during the heating, the dispersion is continually agitated by means of a gas charged to chamber 1, by way of valve 15. The gas exits from chamber 1 by way of valve means 17 and the rate of flow of gas through chamber 1 can be regulated in this fashion. The agitating gas can be an inert gas such as nitrogen or a reducing gas such as hydrogen or a mixture of such gases. It is preferable, however, to avoid the use of gases containing excessive amounts of molecular oxygen otherwise a subsequent reduction step may be required to produce the desired nickel coated product. Obviously, if desired, the effluent gas from valve 17 can be recycled to chamber 1 through valve means 15. Also, effective agitation is best assured by providing a gas permeable foraminous retainer or porous filter 19 in the lower portion of chamber 1. Element 19 usually extends over the entire cross-sectional area of chamber 1 in a horizontal plane.

After the coating is complete, heating of chamber 1 is discontinued. It is oftentimes preferable to briefly continue introducing agitation gas to chamber 1 after the heating is discontinued to cool the coated material. Solution 3 is removed from chamber 1 by way of valve means 21 through filter means 23 which retains the coated material in chamber 1. Solution 3 can be recycled to tank 11 if desired. The coated material is then removed from chamber 1 by any suitable means such as by disassembling chamber 1.

Although the above described embodiment relates to a batch process, it is to be understood that the process of the present invention can be conducted in a continuous or semi-continuous fashion.

Broadly, the nickel compounds employed in the practice of the present invention include those soluble compounds of nickel which are normally solid at room temperature and which are decomposable at temperatures above about room temperature. Accordingly, suitable soluble compounds include the organic and inorganic salts of nickel as well as the organo-metallic compounds and complexes of nickel. Especially preferred are those soluble compounds of nickel which decompose between about 195° C. and 280° C. Accordingly, specific nickel compounds which can be employed in the practice of the present invention include among others, nickelous formate, nickelous oxalate, nickel tartrate, nickelous acetate and the like.

The solvent employed in the practice of the present invention is not in itself especially critical provided that the solvent selected has a boiling temperature at the pressure involved which is higher than the temperature required to decompose the nickel compound. Obviously, the solvent selected must not be one which can react adversely to any extent with the nickel compound employed. Many solvents of the above described properties are known to the art. Accordingly, a listing of specific polar and nonpolar solvents is not deemed necessary. However, the various glycols such as ethylene glycol, diethylene glycol, triethylene glycol are especially suitable. Also useful are 1,6-hexanediol, 2,3-butanediol and 1,5-pentanediol.

The alkaline earth carbonates employed in the practice of the present invention have an average particle diameter between about 1.0 to 10 microns. Especially preferred are the nickel encapsulated alkaline earth carbonates wherein the carbonate has an average particle diameter below about 5 microns. Alkaline earth carbonates having average particle diameters of less than about 10 microns can be obtained commercially or can be produced by way of the various attrition processes known to the art.

The concentration of nickel compound in solution employed in the practice of the present invention can vary over a wide range. The primary factor controlling the concentration employed other than the solubility of the compound in the solvent involved is the thickness of the nickel coating desired on the final nickel encapsulated alkaline earth carbonate.

There follows a non limiting illustrative example of the practice of the present invention.

Example I.—Employing apparatus similar to that shown in the drawing, charge a solution 50 gram of nickel formate in 1800 mls. ethylene glycol to chamber 1. Add 375 grams of an alkaline earth carbonate having an average particle diameter of about 2–3 microns to the solution. The dispersion is agitated by nitrogen which continually flows through the dispersion. Chamber 1 is heated to about 195° C. for 24 hours. The nickel encapsulated alkaline earth carbonate particles are removed from chamber 1 and washed and dried in hydrogen at 300° C. Upon examination the particles are found to be completely coated with nickel of a uniform thickness about 4% by weight nickel was associated with each particle.

Example II.—20 grams of nickel(ous) oxalate was dissolved in 1.800 ml. of 1,6-hexanediol. 250 grams of alkaline earth carbonate was slurried in the solution and the solution was heated to 195° C. Digestion was continued for twenty-four hours under reflux and the material was allowed to cool to room temperature. The solution was filtered and the product was dried in an atmosphere of hydrogen for 2 hours at 300° C. The carbonates were coated with 4% nickel.

Example III.—24.0 grams of nickel(ous) acetate was dissolved in 1.800 ml. of 2,3-butanediol. 250 grams of alkaline earth carbonate was slurried in the solution. The solution was heated to 210° C. and the solution was digested for 24 hours under reflux. The solution was cooled to room temperature and then was filtered. The product was dried in hydrogen for 2 hours at 300° C. The carbonate was coated with 4% nickel by weight.

It is apparent that modifications and changes can be made within the spirit and scope of the present invention, but it is our intention, however, only to be limited by the scope of the following claims.

As our invention, we claim:
1. A process for producing particulate nickel coated alkaline earth carbonates, the steps which comprise:
   (a) dissolving a decomposable nickel compound in a solvent which has a boiling point above the temperature required to decompose said decomposable nickel compound,
   (b) dispersing an alkaline earth carbonate having an average particle diameter between about 1.0 and 10 microns in the solution of decomposable nickel compound,
   (c) agitating and heating the dispersion at a temperature which is sufficient to thermolytically decompose said nickel compound and thereby coat the dispersed particles of alkaline earth carbonates.
2. The process of claim 1 wherein said alkaline earth carbonate has an average particle diameter of less than about 5 microns.
3. The process of claim 1 wherein said decomposable nickel compound is one which decomposes between about room temperature and below boiling of the solvent.
4. The process of claim 1 wherein said decomposable nickel compound is an inorganic salt of nickel.

5. The process of claim 1 wherein said decomposable nickel compound is an organic salt of nickel.

6. The process of claim 1 wherein said decomposable nickel compound is nickel formate.

7. The process of claim 1 wherein said solution of a decomposable compound includes a glycol as a solvent.

8. The process of claim 1 wherein said solution of a decomposable nickel compound includes ethylene glycol as a solvent.

9. The process of claim 1 wherein said solution of a decomposable nickel compound is a solution of nickel formate in ethylene glycol.

References Cited

UNITED STATES PATENTS

| | | | |
|---|---|---|---|
| 2,831,044 | 4/1958 | Bourgault et al. | 117—113 X |
| 2,853,398 | 9/1958 | Mackiw et al. | 117—113 X |
| 3,022,185 | 2/1962 | Delfosse | 117—100 X |
| 3,147,154 | 9/1964 | Cole et al. | 117—113 X |
| 3,216,845 | 11/1965 | Brown | 117—160 X |
| 3,329,622 | 7/1967 | Harris et al. | 117—100 X |

OTHER REFERENCES

"New Cathode For High Power Electron Tube," Bell Laboratories Record, vol. 43, December 1965, pp. 460–1.

WILLIAM D. MARTIN, Primary Examiner

MATHEN R. P. PERRONE, Jr., Assistant Examiner

U.S. Cl. X.R.

117—227